(12) United States Patent
Wagner et al.

(10) Patent No.: US 6,931,776 B2
(45) Date of Patent: Aug. 23, 2005

(54) APPARATUS FOR THE SECTION-WISE AUTOFRETTAGE OF GUN BARRELS

(75) Inventors: Hartmut Wagner, Günterode (DE); Heinz Günter Breuer, Duisberg (DE); Hans Hülsewis, Duisberg (DE); Berthold Baumann, Eschede (DE)

(73) Assignee: Rheinmetall W&M GmbH, Unterluss (DE)

( * ) Notice: Subject to any disclaimer, the term of this patent is extended or adjusted under 35 U.S.C. 154(b) by 23 days.

(21) Appl. No.: 10/622,485

(22) Filed: Jul. 21, 2003

(65) Prior Publication Data

US 2004/0103576 A1 Jun. 3, 2004

(30) Foreign Application Priority Data

Jul. 26, 2002 (DE) ........................ 102 34 029

(51) Int. Cl.[7] .............................................. B21D 26/02
(52) U.S. Cl. ........................ 42/76.1; 42/76.01; 72/61; 89/14.7
(58) Field of Search .................... 89/14.7; 42/76.01, 42/76.1; 72/61, 58, 62; 73/167; 277/650

(56) References Cited

U.S. PATENT DOCUMENTS

| | | | |
|---|---|---|---|
| 1,391,009 A | | 9/1921 | Schneider |
| 1,495,587 A | | 5/1924 | Grimm |
| 1,553,824 A | * | 9/1925 | Langenberg ................ 89/14.7 |
| 1,725,836 A | * | 8/1929 | Solberg ..................... 277/650 |
| 3,009,721 A | * | 11/1961 | Newton ...................... 277/529 |
| 3,767,215 A | * | 10/1973 | Brown ....................... 277/638 |
| 4,848,777 A | * | 7/1989 | Zollo et al. ................. 277/322 |
| 5,177,990 A | * | 1/1993 | Isgen .......................... 72/54 |

FOREIGN PATENT DOCUMENTS

| | | | | |
|---|---|---|---|---|
| DE | 1124987 | | 3/1962 | |
| JP | 63006271 A | * | 1/1988 | ............ F16J/15/12 |

* cited by examiner

Primary Examiner—Peter M. Poon
Assistant Examiner—Gabriel S. Sukman
(74) Attorney, Agent, or Firm—Venable LLP; Stuart I. Smith

(57) ABSTRACT

An apparatus for the section-wise autofrettage of gun barrels (22) by a hydraulic pressure generated inside the barrel. The apparatus (1, 1', 1") comprises a mandrel-shaped insert (2, 2', 2") inserted into the barrel (22) from the breech opening. A first sealing device (3) is disposed at one end of the insert (2, 2', 2"), and has a seal packet (5) disposed on a seal seat (4) of the insert (2, 2', 2"). The seal seat (4) is limited at the front by a threaded sleeve (7) screwed onto the insert (2, 2', 2"), and an annular intermediate part (8) adjoining the threaded sleeve (7) at the rear. The seal packet (5) includes at least one O-ring (10) held by a shoulder (9) of the mandrel-shaped insert (2, 2', 2"), and a high-pressure seal (15) formed by two partial rings (13, 14) that are connected to one another by a conical contact surface (16).

12 Claims, 2 Drawing Sheets

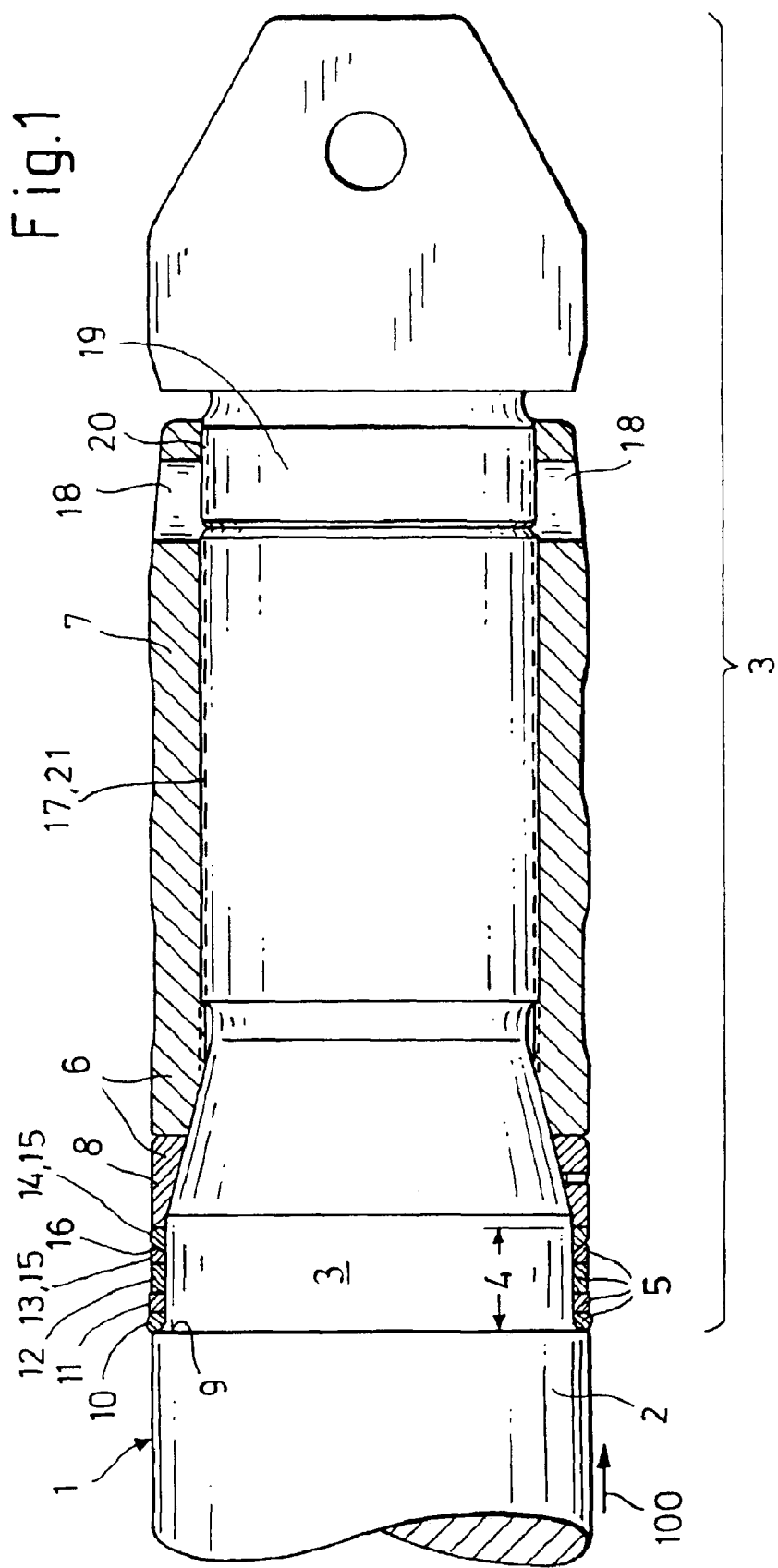

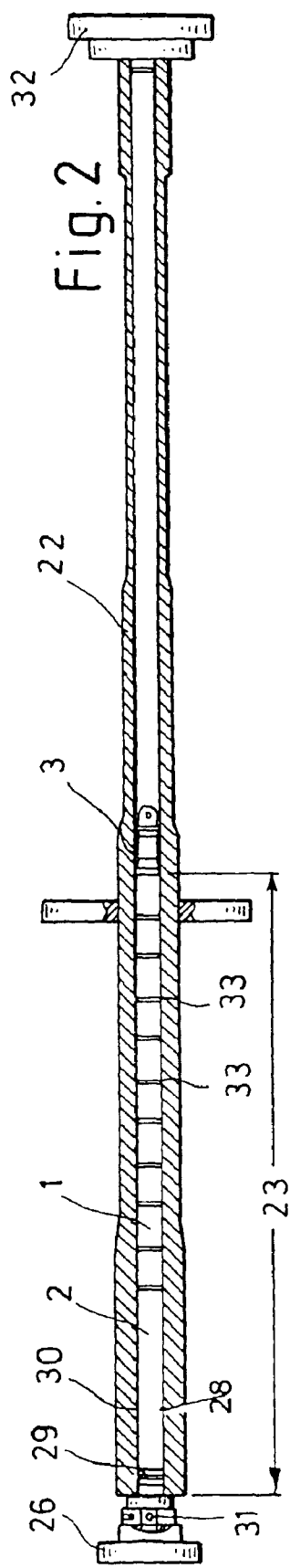
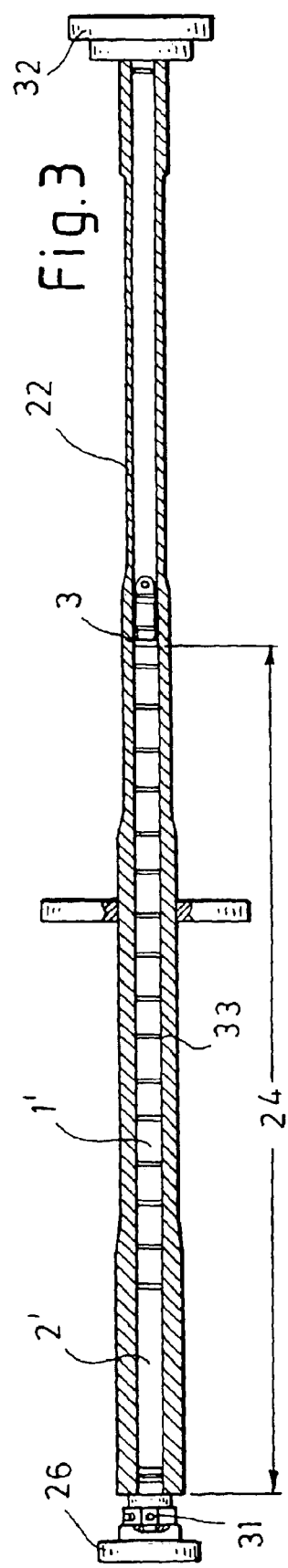
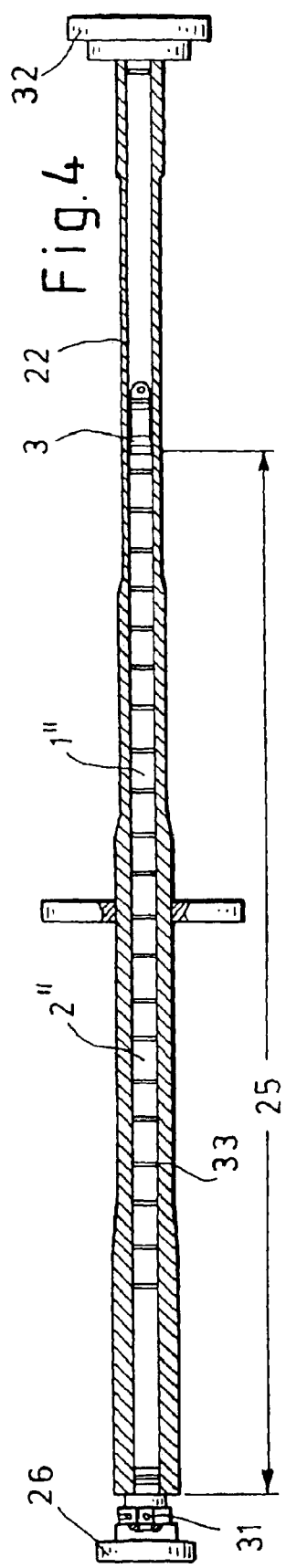

APPARATUS FOR THE SECTION-WISE AUTOFRETTAGE OF GUN BARRELS

CROSS REFERENCE TO RELATED APPLICATION

This application claims the priority of German Patent Application DE 102 34 029.3 filed Jul. 26, 2002, which is incorporated herein by reference.

BACKGROUND OF THE INVENTION

The invention relates to an apparatus for the section-wise autofrettage of or cold working barrels, particularly gun barrels, by a hydraulic internal pressure that is generated inside the barrel.

During firing, gun barrels are stressed by extremely high gas pressures, which cause the barrel, and thus the inside barrel surface, to expand. To increase the resistance to barrel expansion during firing, it is known to subject the corresponding barrel to an autofrettage. In the process, pressure exerted on the inside surface of the barrel exceeds the elasticity limit of the inside layers, thereby causing a permanent deformation through the expansion of these layers, which press against the outside layers. The permanent deformation is not subjected to further changes during firing, because the high pressure attained in the autofrettage is not reached again.

German patent DE-PS 1 124 987 discloses a method for the autofrettage of gun barrels, in which a hydraulic internal pressure is generated inside the barrel. The pressure decreases continuously with increasing distance from the charge-side barrel end, taking into account the pressure course of the propellant-charge gases in the barrel during firing. To this end, a highly viscous fluid that is under high pressure flows continuously through the annular gap formed between the inside wall of the barrel and a mandrel-shaped metal insert. The width of the annular gap determines the local pressure stress.

It is further known from German Patent No. DE-PS 1 124 987 that it was not possible up to now to perform a satisfactory section-wise autofrettage, because the sealing devices required between the different longitudinal sections were not available.

SUMMARY OF THE INVENTION

This object is achieved according to the present invention to provide an apparatus of the type mentioned at the outset for performing a section-wise autofrettage.

This object is achieved according to the present invention, which is essentially based on the concept of disposing a first sealing device at one end of a mandrel-shaped metal insert, with the first sealing device having a seal packet that is disposed on a seal seat on the insert. The seat is limited at the front by a holding device comprising a threaded sleeve that can be screwed onto the insert, and an annular intermediate part that adjoins the threaded sleeve at the rear. The seal packet includes at least one O-ring, which is held by a shoulder of the mandrel-shaped metal insert, a leather ring, a bearing ring and a high-pressure seal formed from two partial rings. The two partial rings have conical contact surfaces, so that when pressure is exerted, the high-pressure seal of one of the two partial rings is pressed outward against the inside wall of the barrel, along the conical contact surface, and the other of the two partial rings is pressed inward against the metal insert, along the conical contact surface, thereby effecting a seal under extremely high pressures.

It has proven especially advantageous when the seal packet includes an elastic O-ring that is held by the shoulder of the insert, and a leather ring that is supported between the O-ring and the bearing ring. In this case, the O-ring, which preferably comprises rubber, effects the seal in the lower pressure range. In contrast, the leather ring, made of commercially available cowhide leather, for example, prevents the O-ring from being extruded into the gap of the consecutive bearing ring under higher pressures. The high-pressure seal formed by the two partial rings then only produces the seal under high pressures.

It has proven advantageous for a stud to be inserted into the threaded sleeve of the holding device on the side or end opposite the seal packet. In the region engaged by the stud, the thread of the threaded sleeve runs in the direction opposite that of the remainder of the thread, so the threaded sleeve can be rotated away from the seal packet through the rotation of the threaded pin. As a result, if the seal packet jams, it can be detached in a simple manner from the barrel opening, e.g., the muzzle of the gun barrel.

For also allowing longer mandrel-shaped metal inserts to be inserted easily into the respective barrel, it has proven advantageous for the circumferential surface of the mandrel-shaped metal insert to be provided with annular depressions that are spaced from one another and extend from the surface into the interior of the insert. In this instance, the insert can readily follow the course of the gun barrel when inserted.

Further details about and advantages of the invention ensue from the following description of exemplary embodiments explained in conjunction with figures.

BRIEF DESCRIPTION OF THE DRAWINGS

FIG. 1 is a longitudinal section of the front region of an apparatus according to the invention for the autofrettage of a gun barrel, having a sealing device.

FIGS. 2 through 4 illustrate a gun barrel in which three segments are subjected to autofrettage consecutively with different apparatuses according to the invention.

DETAILED DESCRIPTION OF THE INVENTION

FIG. 1 illustrates an apparatus 1 in accordance with the invention, which includes a mandrel-shaped metal insert 2 that has one end connected to a first sealing device 3 for the caliber region of a gun barrel.

The first sealing device 3 has a seal packet 5, which is disposed on an annular seal seat 4 on the surface of the metal insert 2, with the seal seat 4 being limited at the front by a holding device 6 comprising a threaded sleeve 7 that can be screwed onto the metal insert 2, and an annular intermediate part 8 that adjoins the threaded sleeve 7 at the rear. The part 8 thus is disposed between the seal packet and the sleeve 7 and tends to compress the seals of the seal packet 5 when the sleeve 7 is screwed onto the mandrel.

The seal packet 5 includes a rubber O-ring 10, which is held by a shoulder 9 of the metal insert 2, a leather ring 11 that adjoins the O-ring, a bearing ring 12 and a high-pressure seal 15, which is formed by two partial rings 13, 14 and has conical contact surfaces 16. The bearing ring 12 and the two partial rings 13, 14 are made of steel.

When pressure builds up in the corresponding segment of the gun barrel, the O-ring 10 is acted upon first from the pressure side 100, and effects the seal in the lower pressure range. As the pressure increases, the leather ring 11 then prevents the O-ring 10 from being extruded into the gap between the bearing ring 12 and the inside surface of the barrel. Moreover, the bearing ring 12 presses against the first partial ring 13, which is pushed onto the second partial ring 14 via the conical contact surface 16 as the pressure increases. This causes a radial expansion and the pressing of this partial ring 13 against the inside wall of the barrel, and a radial compression and pressing of the partial ring 14 against the metal insert 2, and thus a seal against extremely high pressures.

Bores 18, through which a toggle-like pin (not shown) can be inserted and then manually rotated for adjusting the first seal packet 5, are provided for screwing the threaded sleeve 7 of the holding device 6 onto the corresponding thread 17 of the mandrel 2 of the apparatus 1.

A stud 19 is inserted into the threaded sleeve 7, on the side opposite the seal packet 5. In this region, the threaded sleeve 7 has a thread 20, which runs in the direction opposite that of the thread 21 engaging the thread 17 of the apparatus 1. Accordingly, when the stud 19 is rotated, the threaded sleeve 7 can be rotated away from the seal packet 5. Consequently, if the seal packet 5 jams, it can be detached simply from the muzzle of the barrel.

FIGS. 2 through 4 illustrate a gun barrel 22 of a tank, whose outside diameter decreases in stages along the barrel, corresponding to the gas-pressure stress during firing.

For optimum material utilization, the gun barrel 22 is subjected to a hydraulic autofrettage over a variable length. In the example, the barrel is divided into three regions 23 through 25 for the autofrettage or cold working process (FIGS. 2 through 4). The autofrettage pressures $p_1$, $p_2$ and $p_3$ for the individual barrel regions 23 through 25 are to be selected according to the dimensions of the barrel 22 such that $p_1 > p_2 > p_3$. For executing the autofrettage, the barrel 22 is held in a barrel-retaining device 32, only indicated schematically. It is conceivable to divide the barrel into more or fewer autofrettage segments.

The barrel regions 23 through 25 are subjected to autofrettage consecutively. For this purpose, a separate apparatus 1, 1' and 1" in accordance with the invention is provided for each individual autofrettage segment. The apparatuses respectively comprise a metal insert 2, 2' and 2" located in a retaining device 26, a first sealing device 3, which is to be disposed in the caliber region 27 of the barrel 22, and a correspondingly designed second sealing device 29, which is to be disposed in the chamber or breech region 28 of the barrel 22.

To keep the required oil volume to a minimum, the outside diameter of the metal inserts 2, 2' and 2" nearly matches the inside diameter of the barrel 22. In addition, in the chamber region 28, an additional filler piece 30 is used for this purpose.

Oil is supplied via bores 31 in the metal insert 2, 2' and 2" from the respective retaining device 26 that retains the apparatus 1, 1' and 1".

As can be inferred from FIG. 2, the apparatus 1 is first inserted into the barrel 22 and connected to the oil supply, and this region 23 of the barrel 22 is then charged with the pressure $p_1$.

After the autofrettage has ended in the barrel region 23, the apparatus 1 is removed from the barrel 22, and the apparatus 1' is subsequently inserted into the barrel region 24 (FIG. 3). Oil is then introduced into this barrel region, the barrel 22 is charged with a pressure $p_2$ and the apparatus 1' is removed again from the barrel 22.

The autofrettage is then performed in the barrel region 25 (FIG. 4) through the insertion of the apparatus 1" into the barrel 22 and the corresponding charging of the barrel 22 with an oil pressure $p_3$.

As can also be inferred from FIGS. 2 through 4, the mandrel-shaped metal inserts 2, 2' and 2" have annular depressions 33, which are spaced from one another and extend from the surface into the interior of the metal inserts 2, 2' and 2" for allowing the metal inserts 2, 2' and 2" to be easily inserted into the barrel 22.

The invention now being fully described, it will be apparent to one of ordinary skill in the art that many changes and modifications can be made thereto without departing from the spirit or scope of the invention as set forth herein.

What is claimed is:

1. An apparatus for the section-wise autofrettage of a barrel;
   by a hydraulic internal pressure generated inside the barrel, said apparatus comprising:
   a mandrel-shaped insert that can be inserted into the barrel from a barrel opening end and has connected a first sealing device, for a caliber region of the barrel connected to one end thereof;
   the first sealing device has a seal packet, which is disposed on a seat seal formed on the insert, with the seat seal being limited at the front by a holding device, comprising a threaded sleeve that is screwed onto the insert, and an annular intermediate part, that adjoins the threaded sleeve at the rear and engages the seal packet;
   a stud is inserted into the threaded sleeve of the holding device on an end opposite the seal packet, with the thread of the threaded sleeve in the region engaged by the stud running in the direction opposite to a remainder of the thread of the sleeve so that the threaded sleeve can be rotated away from the seal packet through rotation of the stud,
   the seal packet includes at least one O-ring, which is held by a shoulder of the insert adjacent the seal seat, a leather ring, a bearing ring, and a high-pressure seal formed from two partial rings, with the partial rings being connected to one another by a conical contact surface such that, when pressure is exerted onto the high-pressure seal, one of the two partial rings is pressed outward against an inside wall of the gun barrel along the contact surface, and the other of the two partial rings is pressed inward against the metal insert along the conical contact surface.

2. The apparatus according to claim 1, wherein the O-ring of the seal packet is elastic, and is held by the shoulder of the insert, and the leather ring is supported against the O-ring and against the bearing ring.

3. The apparatus according to claim 1, wherein the O-ring comprises rubber.

4. The apparatus according to claim 1, wherein the two partial rings of the high-pressure seal comprise steel.

5. The apparatus according to claim 1, wherein the leather ring comprises cowhide leather.

6. The apparatus according to claim 1, further comprising a second sealing device for a breech region of the barrel connected to the opposite end of the mandrel-shaped insert, with the second sealing device essentially corresponding in design to the first sealing device.

7. An apparatus for the section-wise autofrettage of a barrel by a hydraulic internal pressure generated inside the barrel, said apparatus comprising:
   a mandrel-shaped insert that can be inserted into the barrel from a barrel opening end and has connected a first sealing device, for a caliber region of the barrel connected to one end thereof;

the first sealing device has a seal packet, which is disposed on a seat seal formed on the insert, with the seat seal being limited at the front by a holding device, comprising a threaded sleeve that is screwed onto the insert, and an annular intermediate part, that adjoins the threaded sleeve at the rear and engages the seal packet;

the seal packet includes at least one O-ring, which is held by a shoulder of the insert adjacent the seal seat, a leather ring, a bearing ring, and a high-pressure seal formed from two partial rings, with the partial rings being connected to one another by a conical contact surface such that, when pressure is exerted onto the high-pressure seal, one of the two partial rings is pressed outward against an inside wall of the gun barrel along the contact surface, and the other of the two partial rings is pressed inward against the metal insert along the conical contact surface, wherein the mandrel-shaped insert is provided with annular, spaced depressions on its circumferential surface with the depressions extending from the circumferential surface, into an interior of the insert.

8. The apparatus according to claim 7, wherein the O-ring of the seal packet is elastic, and is held by the shoulder of the insert, and the leather ring is supported against the O-ring and against the bearing ring.

9. The apparatus according to claim 7, wherein the O-ring comprises rubber.

10. The apparatus according to claim 7, wherein the two partial rings of the high-pressure seal comprise steel.

11. The apparatus according to claim 7, wherein the leather ring comprises cowhide leather.

12. The apparatus according to claim 7, further comprising a second sealing device for a breech region of the barrel connected to the opposite end of the mandrel-shaped insert, with the second sealing device essentially corresponding in design to the first sealing device.

* * * * *